US011835023B2

(12) United States Patent
Young et al.

(10) Patent No.: US 11,835,023 B2
(45) Date of Patent: Dec. 5, 2023

(54) HYDROSTATICALLY COMPENSATED CAES SYSTEM HAVING AN ELEVATED COMPENSATION LIQUID RESERVOIR

(71) Applicant: Hydrostor Inc., Toronto (CA)

(72) Inventors: Davin Young, Toronto (CA); Cameron Lewis, Toronto (CA)

(73) Assignee: Hydrostor Inc., Toronto (CA)

( * ) Notice: Subject to any disclaimer, the term of this patent is extended or adjusted under 35 U.S.C. 154(b) by 112 days.

(21) Appl. No.: 17/422,619

(22) PCT Filed: Feb. 26, 2020

(86) PCT No.: PCT/CA2020/050246
§ 371 (c)(1),
(2) Date: Jul. 13, 2021

(87) PCT Pub. No.: WO2020/172748
PCT Pub. Date: Sep. 3, 2020

(65) Prior Publication Data
US 2021/0388810 A1    Dec. 16, 2021

Related U.S. Application Data

(60) Provisional application No. 62/811,087, filed on Feb. 27, 2019.

(51) Int. Cl.
*B65G 5/00* (2006.01)
*F03B 13/06* (2006.01)
*F17C 1/00* (2006.01)

(52) U.S. Cl.
CPC ............... *F03B 13/06* (2013.01); *B65G 5/00* (2013.01); *F17C 1/007* (2013.01);
(Continued)

(58) Field of Classification Search
CPC .. F03B 13/06; B65G 5/00; F17C 1/007; F17C 2201/052; F17C 2221/031;
(Continued)

(56) References Cited

U.S. PATENT DOCUMENTS 3,643,426 A * 2/1972 Janelid ...................... F02C 6/16
405/59
3,895,493 A    7/1975 Rigollot
(Continued)

FOREIGN PATENT DOCUMENTS

CA          1179511 A     12/1984
CA          1281611 C      3/1991
(Continued)

OTHER PUBLICATIONS

Office Action dated Jan. 5, 2022 for Japanese Application No. 2019-562449.
(Continued)

*Primary Examiner* — Carib A Oquendo
(74) *Attorney, Agent, or Firm* — Glen E. Schumann; Moss & Barnett (57) ABSTRACT

A hydrostatically compensated compressed air energy storage system may include an accumulator disposed underground and a compressor/expander subsystem in fluid communication. A compensation shaft may extend between an upper and a lower end and define a shaft depth. An upper end wall can cover the upper end of the shaft. A compensation liquid reservoir can be offset above the upper end wall by a reservoir elevation that is at least about 15% of the shaft depth. A compensation liquid flow path may extend between the compensation liquid reservoir and the accumulator and can include the compensation shaft and a liquid supply conduit extending between the compensation liquid reservoir and the upper end of the compensation shaft whereby a (Continued)

total hydrostatic pressure at the lower end of the shaft is greater than a hydrostatic pressure at a depth that is equal to the shaft depth.

20 Claims, 5 Drawing Sheets

(52) U.S. Cl.
CPC .. *F17C 2201/052* (2013.01); *F17C 2221/031* (2013.01); *F17C 2223/0153* (2013.01); *F17C 2223/035* (2013.01); *F17C 2227/0157* (2013.01); *F17C 2270/0142* (2013.01)

(58) Field of Classification Search
CPC ........ F17C 2223/035; F17C 2223/0153; F17C 2270/0157; F17C 2270/0152; F17C 2270/0142; Y02E 60/16; Y02E 70/30
See application file for complete search history.

(56) References Cited

U.S. PATENT DOCUMENTS

| | | | |
|---|---|---|---|
| 3,939,356 A | 2/1976 | Loane | |
| 3,988,897 A * | 11/1976 | Strub | F02C 7/143 60/659 |
| 3,996,741 A | 12/1976 | Herberg | |
| 4,085,971 A | 4/1978 | Jacoby | |
| 4,147,204 A | 4/1979 | Pfenninger | |
| 4,150,547 A | 4/1979 | Hobson | |
| 4,391,552 A | 7/1983 | O'hara | |
| 4,392,354 A | 7/1983 | Schwarzenbach | |
| 4,454,721 A | 6/1984 | Hurlimann | |
| 4,523,432 A | 6/1985 | Frutschi | |
| 4,538,414 A | 9/1985 | Saleh | |
| 5,634,340 A | 6/1997 | Grennan | |
| 7,663,255 B2 | 2/2010 | Kim | |
| 8,739,522 B2 | 6/2014 | Anikhindi | |
| 9,803,803 B1 | 10/2017 | Adams | |
| 10,859,207 B2 | 12/2020 | Lewis | |
| 2003/0021631 A1* | 1/2003 | Hayashi | B65G 5/00 405/52 |
| 2011/0094229 A1 | 4/2011 | Freund | |
| 2011/0094231 A1 | 4/2011 | Freund | |
| 2011/0094242 A1 | 4/2011 | Koerner | |
| 2011/0100010 A1 | 5/2011 | Freund | |
| 2011/0296823 A1* | 12/2011 | McBride | F15B 21/08 60/407 |
| 2012/0102954 A1 | 5/2012 | Ingersoll | |
| 2013/0061591 A1 | 3/2013 | Bove | |
| 2014/0013735 A1 | 1/2014 | Mcbride | |
| 2014/0020369 A1 | 1/2014 | Guidati | |
| 2015/0000248 A1 | 1/2015 | Del Omo | |
| 2015/0015210 A1 | 1/2015 | Bradwell | |
| 2015/0091301 A1 | 4/2015 | Littmann | |
| 2015/0125210 A1 | 5/2015 | Ingersoll | |
| 2015/0267612 A1 | 9/2015 | Bannari | |
| 2017/0138674 A1 | 5/2017 | Pourima | |
| 2017/0159503 A1 | 6/2017 | Plais | |
| 2018/0017213 A1 | 1/2018 | Deleau | |
| 2018/0094581 A1 | 4/2018 | Teixeira | |
| 2019/0346082 A1 | 11/2019 | Lewis | |

FOREIGN PATENT DOCUMENTS

| | | |
|---|---|---|
| CA | 2785004 A1 | 6/2011 |
| CA | 2807502 A1 | 2/2012 |
| CA | 2824798 A1 | 7/2012 |
| CA | 2982255 A1 | 10/2016 |
| CA | 3052080 A1 | 8/2018 |
| CA | 3055620 A1 | 9/2018 |
| CN | 103206349 A | 7/2013 |
| CN | 107842392 A | 3/2018 |
| CN | 207847852 U | 9/2018 |
| DE | 2636417 A1 | 2/1978 |
| DE | 102010055750 A1 | 6/2012 |
| EP | 0566868 A1 | 2/1996 |
| EP | 1443177 A1 | 8/2004 |
| EP | 2450549 A2 | 5/2012 |
| EP | 2559881 A2 | 2/2013 |
| EP | 2530283 B1 | 9/2013 |
| EP | 2832666 A1 | 4/2015 |
| EP | 2447501 A2 | 5/2021 |
| FR | 2706432 A1 | 12/1994 |
| FR | 3019854 A1 | 10/2016 |
| GB | 1213112 A | 11/1970 |
| GB | 2013318 A | 8/1979 |
| GB | 2528449 A | 1/2016 |
| JP | S54133211 A | 10/1979 |
| JP | 55-115498 | 8/1980 |
| JP | S5797997 A | 6/1982 |
| JP | H0275730 A | 3/1990 |
| JP | H04121424 A | 4/1992 |
| JP | H05214888 A | 8/1993 |
| JP | H07330079 A | 12/1995 |
| JP | 09-154244 A | 6/1997 |
| JP | 2636417 B2 | 7/1997 |
| JP | H09287156 A | 11/1997 |
| JP | H1121926 | 1/1999 |
| JP | 2005009609 A | 1/2005 |
| JP | 2013509528 A | 3/2013 |
| JP | 2016211515 A | 12/2016 |
| WO | 2011053411 A1 | 5/2011 |
| WO | 2013131202 A1 | 9/2013 |
| WO | 2015015184 A2 | 2/2015 |
| WO | 2015019096 A1 | 2/2015 |
| WO | 2016012764 A1 | 1/2016 |
| WO | 2016131502 A1 | 8/2016 |
| WO | 2016185906 A1 | 11/2016 |
| WO | 2017093768 A1 | 6/2017 |
| WO | 2017140481 A1 | 8/2017 |
| WO | 2017194253 A1 | 11/2017 |
| WO | 2017198397 A1 | 11/2017 |
| WO | 2018141057 A1 | 8/2018 |
| WO | 2019011593 A1 | 1/2019 |

OTHER PUBLICATIONS

International Search Report and Written Opinion received for PCT Serial No. PCT/CA2020/050246 dated May 27, 2020, 10 pgs.

\* cited by examiner

HYDROSTATICALLY COMPENSATED CAES SYSTEM HAVING AN ELEVATED COMPENSATION LIQUID RESERVOIR

CROSS-REFERENCE TO RELATED APPLICATIONS

This application claims priority to U.S. Provisional Patent Application Ser. No. 62/811,087, filed Feb. 27, 2019 and entitled A COMPRESSED GAS ENERGY STORAGE SYSTEM, the entirety of which is incorporated herein by reference.

FIELD

The present disclosure relates generally to a hydrostatically compressed gas energy storage system, and more particularly to a system in which a compensation liquid reservoir is provided at a higher elevation than an upper end of the hydrostatic compensation shaft to help increase the total hydrostatic pressure at a lower end of the shaft to be greater than the natural, hydrostatic pressure at a depth that is equal to the shaft depth.

INTRODUCTION

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus there exists a need for effectively storing the electrical energy produced at a power grid or a renewable source during a non-peak period and providing it to the grid upon demand. Furthermore, to the extent that the infrastructural preparation costs and the environmental impact from implementing such infrastructure are minimized, the utility and desirability of a given solution is enhanced.

Furthermore, as grids transform and operators look to storage in addition to renewables to provide power and remove traditional forms of generation that also provide grid stability, such as voltage support, a storage method that offers inertia based synchronous storage is highly desirable.

International patent publication no. WO2018/141057 discloses a compressed gas energy storage system may include an accumulator for containing a layer of compressed gas atop a layer of liquid. A gas conduit may have an upper end in communication with a gas compressor/expander subsystem and a lower end in communication with accumulator interior for conveying compressed gas into the compressed gas layer of the accumulator when in use. A shaft may have an interior for containing a quantity of a liquid and may be fluidly connectable to a liquid source/sink via a liquid supply conduit. A partition may cover may separate the accumulator interior from the shaft interior. An internal accumulator force may act on the inner surface of the partition and the liquid within the shaft may exert an external counter force on the outer surface of the partition, whereby a net force acting on the partition is less than the accumulator force.

International patent publication no. WO 2018/161172 discloses a thermal storage subsystem that may include at least a first storage reservoir disposed at least partially underground configured to contain a thermal storage liquid at a storage pressure that is greater than atmospheric pressure. A liquid passage may have an inlet connectable to a thermal storage liquid source and configured to convey the thermal storage liquid to the liquid reservoir. A first heat exchanger may be provided in the liquid inlet passage and may be in fluid communication between the first compression stage and the accumulator, whereby thermal energy can be transferred from a compressed gas stream exiting a gas compressor/expander subsystem to the thermal storage liquid.

SUMMARY OF THE INVENTION

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one broad aspect of the teachings described herein, a hydrostatically compensated compressed air energy storage system may include an accumulator disposed underground and having an interior for containing a layer of compressed air above a layer of compensation liquid. A compressor/expander subsystem may be in fluid communication with the accumulator interior via an air flow path and may be configured to selectably convey compressed air into the accumulator and to extract air from the accumulator.

A compensation shaft may extend between an upper end that is proximate the surface of the ground and a lower end that is proximate and in fluid connection with the accumulator and defining a shaft depth. An upper end wall may be configured to cover the upper end of the shaft and to isolate an interior of the compensation shaft from the ambient atmosphere. A compensation liquid reservoir may be spaced apart from the accumulator and may be offset above the upper end wall by a reservoir elevation that is at least about 15% of the shaft depth. A compensation liquid flow path may extend between the compensation liquid reservoir and the accumulator and may include the compensation shaft and a liquid supply conduit extending between the compensation liquid reservoir and the upper end of the compensation shaft whereby a total hydrostatic pressure at the lower end of the shaft is greater than a hydrostatic pressure at a depth that is equal to the shaft depth.

The system may be operable in at least i) a charging mode in which the gas compressor/expander subsystem is configured to covey compressed air at an accumulator pressure into the layer of compressed air within the accumulator which then displaces a corresponding volume of compensation liquid from the layer of compensation liquid within the accumulator out of the accumulator via the compensation liquid flow path thereby maintaining the layer of compressed air at substantially the accumulator pressure during the first charging mode; and, ii) a discharging mode in which the gas compressor/expander subsystem is configured to extract compressed air from within the accumulator which then enables a corresponding volume of compensation liquid to enter the accumulator via the compensation liquid flow path thereby maintaining the pressure within the accumulator at substantially the accumulator pressure during the discharging mode.

The liquid supply conduit may be connected to an opening in the upper end wall of the compensation shaft.

The liquid supply conduit may be connected to an opening in a sidewall of the shaft, proximate the upper end of the compensation shaft.

The compensation liquid reservoir may include at least one of an enclosed tank, an open containment region and a body of water.

The compensation liquid reservoir may be supported at the reservoir elevation by a reservoir support apparatus.

The reservoir support apparatus may include a portion of the ground.

The reservoir elevation may be at least 20% of the shaft depth.

The reservoir elevation may be between about 20% and about 50% of the shaft depth.

The reservoir elevation may be between about 50 m and about 250 m.

The reservoir elevation may be between about 100 m and about 200 m.

The shaft depth may be at least 300 m.

The shaft depth may be between about 400 m and about 500 m.

A sum of the shaft depth and the reservoir elevation may be at least 500 m.

The shaft depth may be measured in a downward direction from the upper end wall of the shaft and the reservoir elevation is measure in an opposing, upward direction from the upper end wall of the shaft.

The accumulator pressure may be between about 40 and about 70 bar.

The accumulator pressure may be between about 50 and about 60 bar.

The total hydrostatic pressure may be at least 80% of the accumulator pressure and may be at least 95% of the accumulator pressure.

Total hydrostatic pressure may be the hydrostatic pressure at a depth that is equal to the shaft depth plus the reservoir elevation.

The compensation liquid may include at least one of water, brine, oil and a combination thereof.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive compressors and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive any suitable expander apparatus or the like, and ultimately to be used to drive a generator or the like to produce electricity. The amount of energy per unit of storage volume that can be stored in a given compressed gas energy storage system may be related to the pressure at which the gas is compressed/stored, with higher pressure storage generally facilitating a higher energy storage. However, containing gases at relatively high pressures in conventional systems, such as between about 45-150 atm, can require relatively strong, specialized and often relatively costly storage containers/pressure vessels.

When gas is compressed to an accumulator or storage pressure for storage (for example during a charging mode) its temperature tends to increase, and if the gas passes through multiple compression stages its temperature can increase with each stage. Further, some compressors may have a preferred inlet temperature range in which they operate with a desired level of efficiency. Gas that has been compressed in a one compression stage may, in some systems, be heated to a temperature that is above a desired inlet temperature for a subsequent compressions stage. Reducing the temperature of the gas exiting an upstream compressions stage before it reaches a subsequent compression stage may be advantageous. In the examples described herein, the accumulator pressures may be between 20 and 70 bar, and optionally may be between about 40 and about 65 bar, between about 50 and about 60 bar or the like. This pressure increase (from substantially atmospheric pressure) may be achieved using one, two, three or more compressions stages as described herein.

Similarly, when compressed gas is removed from an accumulator and expanded for electricity generation (for example when in a discharge mode), its temperature tends to decrease, and if the gas passes through multiple expansion stages its temperature can decrease with each stage. Further, some expanders may have a preferred inlet temperature range in which they operate with a desired level of efficiency. Gas that has been expanded in a one expansion stage may, in some systems, be cooled to a temperature that is below a desired inlet temperature for a subsequent expansion stage. Increasing the temperature of the gas exiting an upstream expansion stage before it reaches a subsequent expansion stage may be advantageous. Thermal energy/heat that is extracted from the compressed gas can be stored in any suitable thermal storage apparatus.

For example, systems in which the accumulator and/or other system components are located underground may utilize one or more excavation shafts or similar structures during the construction phase to help transport equipment and personnel to the underground structures and/or to extract debris and other material from the construction sites. Shafts of this nature will generally extend from an upper end at or proximate the surface of the ground or at grade, or at least accessible from the surface during construction, to a lower end that is adjacent and at least temporarily connected to the underground structure/cavem/chamber, etc. that is being constructed. This can help facilitate the movement of equipment, people and debris. In some examples, more than one such shaft may be created for a variety of reasons, including to help expedite construction, provide two or more access and egress locations for safety-related reasons, provide underground ventilation and other such purposes. In some embodiments of the compressed gas energy storage systems described herein, these shafts may extend at least 100 m, 200 m, 300 m, 400 m, 500 m, 550 m, 600 m 650 m or more into the ground, depending on the design constraints and ground conditions surrounding a given compressed gas energy storage systems. While the term "shaft" is used for convenience, the actual geometry of the structure may vary depending on the particular building techniques used, and may take the form of a decline, chamber or other such structure, and may be substantially vertical or may be inclined, and/or may be generally linear or may have a curved or varying geometry.

Shafts of this nature may be relatively costly and time consuming to create, and in known designs are generally not utilized when the completed compressed gas energy storage system is in use. Optionally, one or more of these shafts or other construction-phase legacy structures may be converted into process connections, such as a compensation liquid shaft that can be used to convey compensation liquid into and out of the accumulator. This may help reduce the overall cost of constructing the compressed gas energy storage system and may help reduce the overall size/footprint of the compressed gas energy storage system. This may also, in some circumstances, help reduce the overall construction time for the compressed gas energy storage system, as at least some aspects of the compensation liquid flow paths need not be separately constructed following the completion of the shaft(s) itself. Alternatively, a compensation liquid shaft may be formed after construction of the accumulator is substantially complete.

Compensation shafts can preferably be configured to form at least part of a liquid flow path that extends between an accumulator and a source or reservoir that contains compensation liquid. The liquid contained within the interior of a compensation shaft can result in a hydrostatic pressure at the lower end of the shaft, and in some examples within the accumulator, that is configured to be approximately the same as a desired operating or storage pressure of the gas within the accumulator (as described in more detail herein). If the upper-end of the shaft is exposed to (e.g. in fluid communication with) the ambient atmosphere the hydrostatic pressure at the lower end of the shaft may be generally proportional to the depth of the shaft (e.g. the height of the water column that ends at the lower end of the shaft). In such configurations, providing a relatively higher hydrostatic pressure may require providing a relatively deeper shaft, whereas providing a relatively lower hydrostatic pressure may require providing a relatively shallower/shorter shaft. This may be useful in some embodiments of a hydrostatically compensated compressed gas energy storage system.

In other embodiments, it may be desirable to operate construction a system with the accumulator at a shallower depth, and therefore having a shorter compensation shaft. For example, shorter shafts may be less costly to manufacture and may reduce the amount of time required to build the system. However, reducing the shaft height will also generally reduce the hydrostatic pressure exerted by the water/fluid at the lower end of the shaft because there is less depth of water. If it is still desired to operate the accumulator at a relatively high pressure—such as approximately the same pressure as could be achieved using a shaft depth of about 600 m, an open, but relatively shorter shaft (e.g. 400 m or 500 m) may not provide the desired hydrostatic pressure at its lower end. In such embodiments, it may be desirable to configure the system so that a total hydrostatic pressure at the lower end of the shaft can be increased/supplemented so that its greater than the natural or unmodified hydrostatic pressure would otherwise be at the shaft depth. Preferably, such an increase in shaft pressure may be achieved without using pumps or other such apparatuses, as they may consume power (thereby reducing the overall efficiency of the system) and may be relatively more complicated to operate in both of the systems operating modes, e.g. may require additional valves, controllers and the like and may not enable the relatively free exchange of water between the accumulator and the compensation system that is described herein.

Optionally, the hydrostatic pressure at the lower end of the shaft may be increased by enclosing the shaft so that its upper-end is generally isolated from the atmosphere and then connecting the interior of the shaft to a compensation liquid reservoir that is itself positioned at a higher elevation than the upper end of the shaft. With a fluid connection established between the shaft and the reservoir the effective height of the water column connected to the reservoir can be increased without requiring a deeper shaft. That is, the total hydrostatic pressure at the lower end of the shaft can be produced by a combined water column height that includes the height/weight of the liquid within the shaft itself plus the height/weight of the water/liquid that is in the fluid conduits and within the reservoir. The effective height of this water column that provides the total hydrostatic pressure can then be the combination of the shaft height and the elevation or offset height of the compensation liquid reservoir above the shaft.

Figure 1:
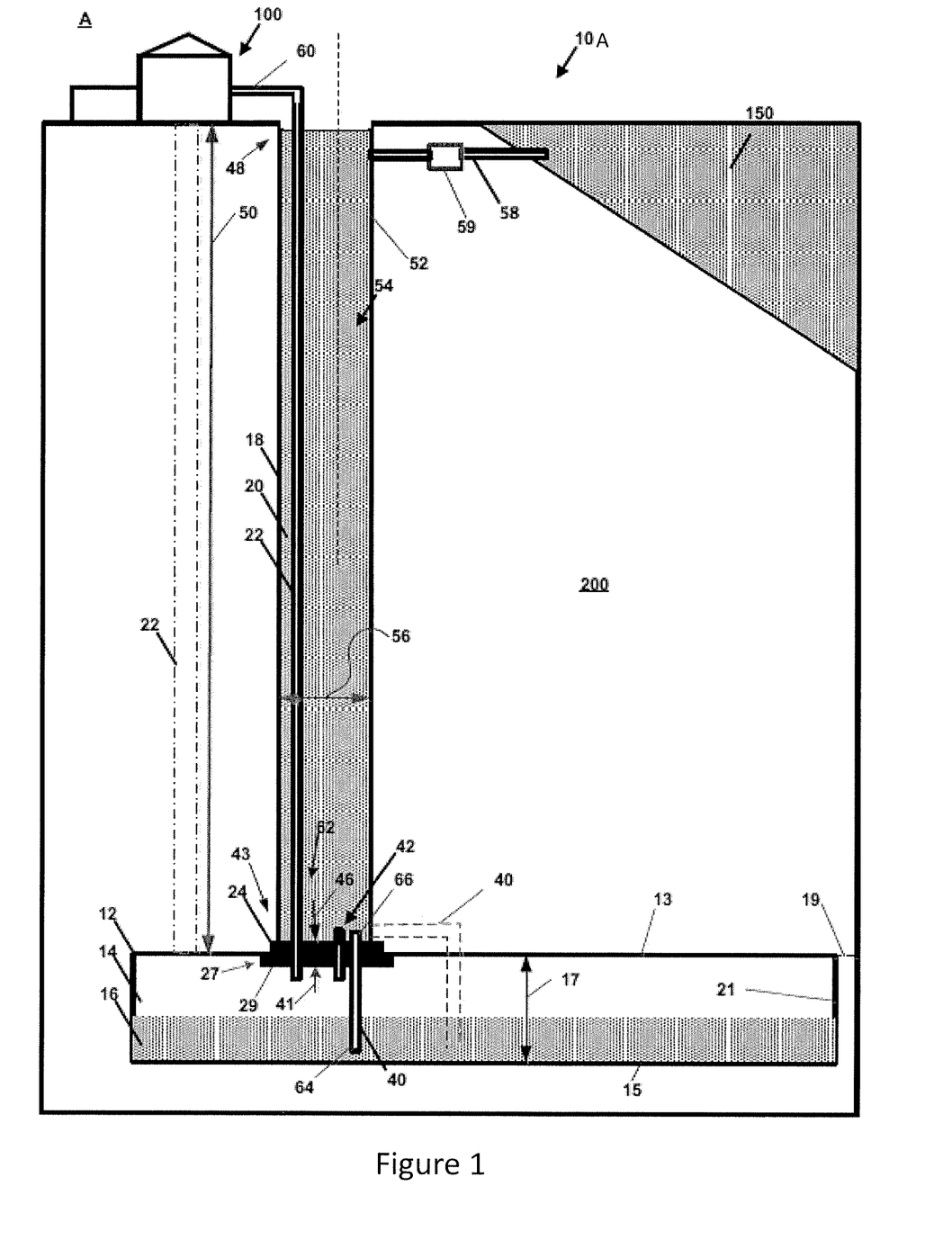
FIG. 1 is a schematic representation of one example of a hydrostatically compressed gas energy storage system.

Referring to FIG. 1 one example of a hydrostatically compensated compressed gas energy storage system 10A, that can be used to compress, store and release a gas, includes an accumulator 12 that is located underground. In this example, the accumulator 12 serves as a chamber for holding both compressed gas and a compensation liquid (such as water) and can include any suitable type of pressure vessel or tank, or as in this example can be an underground cave or chamber that is within ground 200. In this embodiment, accumulator 12 is lined, for example using concrete, metal, plastic and combinations thereof or the like, to help make it substantially gas and/or liquid impermeable so as to help to prevent unwanted egress of gas or liquid from within the interior 23. In another embodiment, the accumulator is preferably impermeable to gas and or liquid without requiring a lining.

The accumulator 12 may have any suitable configuration, and in this example, includes an upper wall 13 and an opposing lower wall 15 that are separated from each other by an accumulator height 17. The upper and lower walls 13 and 15 may be of any suitable configuration, including curved, arcuate, angled, and the like, and in the illustrated example are shown as generally planar surfaces, that are generally parallel to a horizontal reference plane 19. The accumulator 12 also has an accumulator width (not shown—measured into the page as illustrated in FIG. 1). The upper and lower walls 13 and 15, along with one or more sidewalls 21 at least partially define an interior 23 of the accumulator 12, that has an accumulator volume.

The accumulator 12 in a given embodiment of the system 10A can be sized based on a variety of factors (e.g. the quantity of gas to be stored, the available space in a given location, etc.) and may, in some examples may be between about 1,000 m$^3$ and about 2,000,000 m$^3$ or more. For example, in this embodiment the accumulator 12 contains a layer of stored compressed gas 14 atop a layer of compensation liquid 16 when in use, and its volume (and thus capacity) can be selected based on the quantity of gas 14 to be stored, the duration of storage required for system 10A, and other suitable factors which may be related to the capacity or other features of a suitable power source and/or power load (see power source/load S/L in FIG. 2) with which the system 10A is to be associated. The power source/load S/L may be, in some examples, a power grid, a power source (including renewable and optionally non-renewable sources), a large industrial load and the like. Furthermore, the power source and power load may be completely independent of each other (e.g. the power source 25 may be a renewable source, and the power load may be the grid).

Preferably, the accumulator 12 may be positioned below ground or underwater, but alternatively may be at least partially above ground. Positioning the accumulator 12 within the ground 200, as shown, may allow the weight of the ground/soil to help backstop/buttress the walls 13, 15 and 21 of the accumulator 12, and help resist any outwardly acting forces that are exerted on the walls 13, 15 and 21 of the interior 23 of the accumulator. Its depth in the ground (shown as the shaft height 50 in FIG. 1) may be established according to the pressures at which the compression/expansion equipment to be used is most efficiently operated, the geology in the surrounding area and the like.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally without requiring further treatment. The liquid that is to be used as the liquid layer 16 in the accumulator 12 may be any suitable liquid, including, but not limited to, water (municipal water, ground water, rain water, etc.), salt water, brine and combinations thereof and the like. Using water may be preferable in some embodiments as a desired quantity of water may be sourced easily, and any liquid which may escape from the system can enter the groundwater system without environmental concerns. In this embodiment, the compressed gas 14 is compressed atmospheric air, and the compensation liquid is water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10A is in use. In this example, the accumulator 12 includes a primary opening 27 that is provided in the upper wall 13. The primary opening 27 may be any suitable size and may have a cross-sectional area (taken in the plane 19) that is adequate based on the specific requirements of a given embodiment of the system 10A. In one embodiment the cross-sectional area is between about 0.75 m2 and about 80 m2 but may be larger or smaller in a given embodiment.

When the system 10A is in use, the primary opening 27 may be sealed using any suitable type of partition that can function as a suitable sealing member. In the embodiment of FIG. 1, the system 10A includes a partition in the form of a bulkhead 24 that covers the primary opening 27. Some examples of suitable partitions are described in PCT/CA2018/050112 and PCT/CA2018/050282, which are incorporated herein by reference.

When the bulkhead 24 is in place, as shown in FIG. 1, it can be secured to, and preferably sealed with the accumulator wall, in this embodiment upper wall 13, using any suitable mechanism to help seal and enclose the interior 23. In other embodiments, the bulkhead 24 may have a different, suitable configuration.

The bulkhead 24 may be manufactured in situ, or may be manufactured offsite, and may be made of any suitable material, including, concrete, metal, plastics, composites and the like. In the illustrated embodiment, the bulkhead 24 is assembled in situ at the interface between a shaft 18 and the accumulator 12 of multiple pieces of reinforced concrete. In this embodiment the shaft 18 is illustrated schematically as a generally linear, vertical column. Alternatively, the shaft 18 may be a generally linear inclined shaft or preferably may be a curved and/or generally spiral/helical type configuration and which may be referred to as a shaft or generally as a decline. Some embodiments may include a generally spiralling configured decline that winds from an upper end to a lower end and can have an analogous function and attributes as the vertical shaft 18 of FIG. 1 despite having a different geometrical configuration. Discussions of the shaft/decline 18 and its purposes in one embodiment can be applied to other embodiments described herein.

Figure 3:
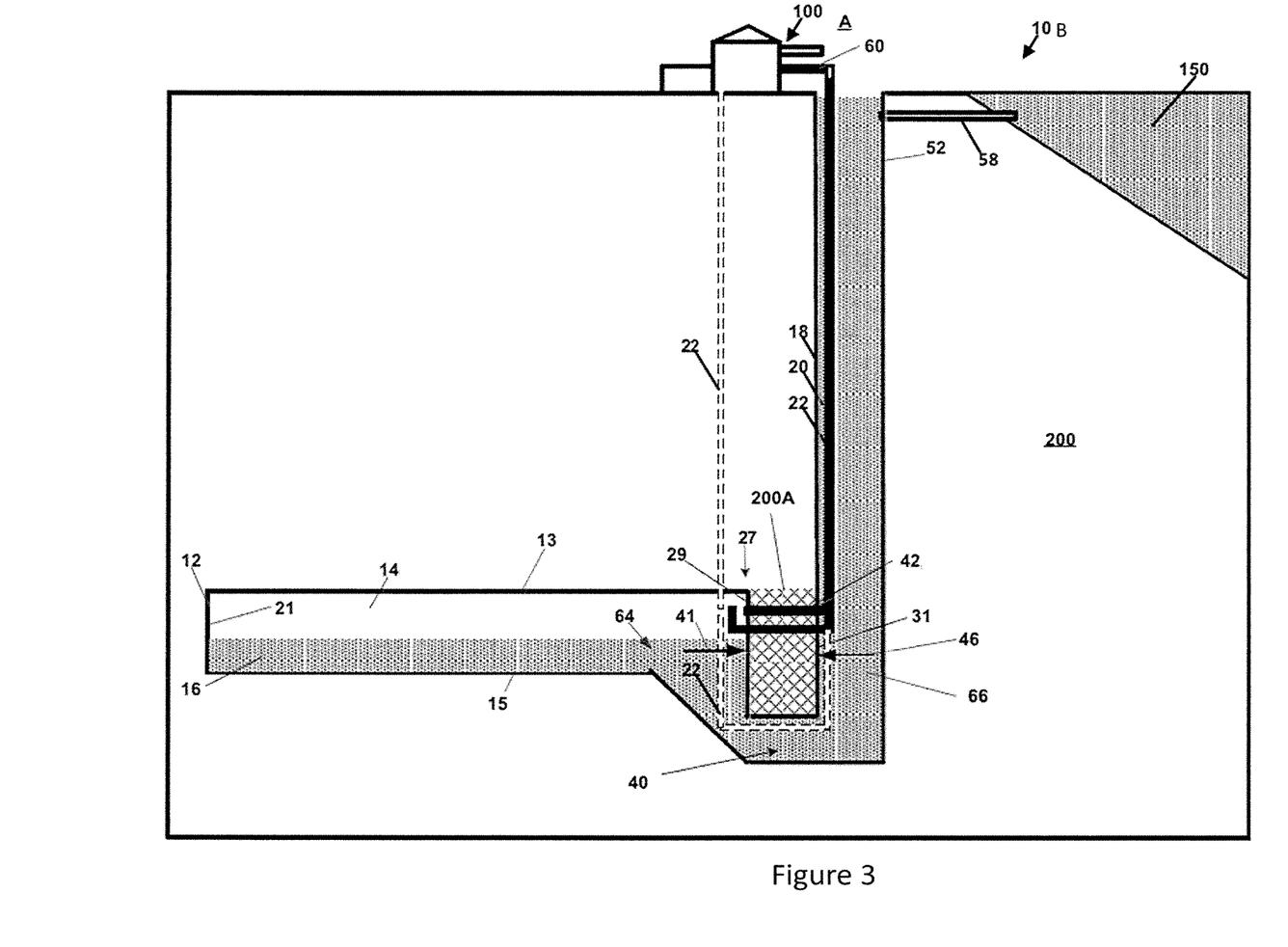
FIG. 3 is a schematic representation of another example of a hydrostatically compressed gas energy storage system.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21 as shown in FIG. 3), in a lower surface (such as lower surface 15) or other suitable location. The location of the primary opening 27, and the associated partition, can be selected based on a variety of factors including, for example, the soil and underground conditions, the availability of existing structures (e.g. if the system 10A is being retrofit into some existing spaces, such as mines, quarries, storage facilities and the like), operating pressures, shaft configurations and the like. For example, some aspects of the systems 10A described herein may be retrofit into pre-existing underground chambers, which may have been constructed with openings in their sidewalls, floors and the like. Utilizing some of these existing formations may help facilitate construction and/or retrofit of the chambers used in the system and may reduce or eliminate the need to form additional openings in the upper surfaces of the chambers. Reducing the total number of openings in the accumulator may help facilitate sealing and may help reduce the chances of leaks and the like. In other embodiments, the components of the systems described herein may be purpose-built for the described purposes and may be configured in manner that helps facilitate both construction and operation of the systems.

When the primary opening 27 extends along the sidewall 21 of the accumulator 12 as shown in the embodiment of FIG. 3, it may be positioned such that is contacted by only the gas layer 14 (i.e. toward the top of the accumulator 12), contacted by only the liquid layer 16 (i.e. submerged within the liquid layer 16 and toward the bottom of the accumulator) and/or by a combination of both the gas layer 14 and the liquid layer 16 (i.e. partially submerged and partially non-submerged in the liquid). The specific position of the free surface of the liquid layer 16 (i.e. the interface between the liquid layer 16 and the gas layer 14) may change while the system 10 is in use as gas is forced into (causing the liquid layer to drop) and/or withdrawn from the accumulator (allowing the liquid level to rise).

When the accumulator 12 is in use, at least one of the pressurized gas layer 14 and the liquid layer 16 may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 acting on the partition may be at least partially dependent on the pressure of the gas 14 and the cross-sectional area (taken in plane 19) of the inner surface 29. For a given inner surface 29 area, the magnitude of the internal accumulator force 41 may vary generally proportionally with the pressure of the gas 14.

In some embodiments, for example if the compressed gas energy storage system is not hydrostatically compensated, the partition may be configured to resist substantially the entire internal accumulator force 41 and/or may be reinforced with the ground 200 or other suitable structures. Alternatively, an inwardly, (downwardly in this embodiment) acting force can be applied to the outer surface 31 of the bulkhead 24 to help at least partially offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the outer surface 31 to a pressurized environment, such as a pressurized gas or liquid or the distributed weight from a pile of solid material that is in contact with the outer surface 31, and calibrating the pressure acting on the outer surface 31 (based on the relative cross-sectional area of the outer surface 31 and the pressure acting on the inner surface 29) so that the resulting counter force, shown by arrow 46 in FIG. 1, has a desirable magnitude. In some configurations, the magnitude of the counter force 46 may be between about 80% and about 99% of the internal accumulator force 41 and may optionally be between about 90% and about 97% and may be about equal to the magnitude of the internal accumulator force 41.

In the present embodiment, the system 10 includes a shaft 18 that is configured so its lower end 43 is in communication with the opening 27 of the accumulator 12, and its upper end 48 that is spaced apart from the lower end 43 by a shaft depth 50. The shaft depth 50 may be any suitable depth (such as at least 300 m, 400 m, 500 m, 550 m, 600 m, 650 m, or more), and in this embodiment is preferably about 600 m so that a hydrostatic pressure at the lower end 43 (e.g. adjacent the bulkhead 24) is about 60 bar.

At least one shaft sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear, curved, or helical decline, in other embodiments. The upper end 48 of the shaft 18 in this example is open to the atmosphere A, but in other examples may be capped, enclosed or otherwise sealed (see FIGS. 4 and 5). In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 $m^3$ of water. While the schematics included show only one shaft 18, multiple smaller diameter shafts may be used in place of one larger diameter shaft.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink or compensation liquid reservoir 150 to allow water to flow into or out of the interior of the shaft 18 as required when the system 10 is in operational modes. Optionally, a flow control apparatus 59 (as shown schematically in FIG. 1) may be provided in the water supply/replenishment conduit 58. The flow control apparatus 59 may include a valve, sluice gate, controllable pump or other suitable mechanism. The flow control apparatus 59 can be open while the system 10 is in operational modes to help facilitate the desired flow of water between the shaft 18 and the water source/sink 150. Optionally, the flow control apparatus 59 can be closed to fluidly isolate the shaft 18 and the compensation liquid reservoir 150 if desired. For example, the flow control apparatus 59 may be closed to help facilitate draining the interior 54 of the shaft 18 for inspection, maintenance or the like.

The compensation liquid reservoir 150 may be of any suitable nature, and may include, for example a connection to a municipal water supply or reservoir, a purposely built reservoir, an enclosed storage tank, a water tower, an open storage or containment region (e.g, a constructed pond or the like) and/or a natural body of water such as a lake, river or ocean, groundwater, or an aquifer. In the illustrated example, the compensation liquid reservoir 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in FIG. 1 as horizontal, it may be non-horizontal.

In this example, the water 20 in the interior of the shaft 18 bears against the outside of bulkhead 24 and is thereby supported atop bulkhead 24. The amount of pressure acting on the outer surface 31 of the bulkhead 24 in this example will vary with the depth 50 of the water column.

The shaft depth 50 may be selected based on the ground conditions and other location factors, as well as the intended operating conditions of the accumulator and similar process or operation related factors. For example, systems that are intended to have relatively higher operating or accumulator pressures may be positioned relatively deep underground, as the greater the shaft height 50 the greater the natural hydrostatic pressure at the lower end of the shaft. The shaft depth 50 may, in some examples be at least 200 m, 300 m, 400 m, 500 m, 550 m, 600 m, 650 m or more. In the examples illustrated in FIGS. 1 and 3 the shaft depth may be about 600 m, which may provide a natural hydrostatic pressure of about 60-62 bar if the entire shaft were to be filled with water or a compensation liquid having a similar density. This may be desirable when the intended accumulator pressure is also approximately 60 bar (or between about 55 bar and about 65 bar in some examples).

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 can be maintained so that magnitude of the counter force 46 is equal, or nearly equal, to the magnitude of the internal accumulator force 41 exerted by the compressed gas in compressed gas layer 14 stored in accumulator 12 for at least a fraction of the time the system is in operation. In the illustrated embodiment, system 10 is operated so as to maintain a pressure differential (i.e. the difference between gas pressure inside the accumulator 12 and the hydrostatic pressure at the lower end 43 of the shaft 18) below a threshold amount—an amount preferably between 0 and 4 Bar, such as 2 Bar—the resulting net force acting on the bulkhead 24. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the maximum upward pressure on the bulkhead 24 will be 1 Bar higher than the downward pressure on the bulkhead 24 from the water 20 in shaft 18. The maximum pressure differential that is experienced by bulkhead 24 may increase by about 0.1 bar for every meter that the height 17 of the accumulator 12 is increased.

Each of shaft 18 and accumulator 12 may be formed in ground 200 using techniques similar to those used for producing mineshafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 in accumulator 12 using any suitable compressor/expander subsystem 100, and in turn conveying water between the liquid layer 16 in accumulator 12 and the water 20 in shaft 18.

In this embodiment, the system 10A includes a gas flow path that provides fluid communication between the compressor/expander subsystem 100 and the accumulator 12. The gas flow path may include any suitable number of conduits, passages, hoses, pipes and the like and any suitable equipment may be provided in (i.e. in air flow communication with) the gas flow path, including, compressors, extractors, heat exchangers, valves, sensors, flow meters and the like. Referring to the example of FIG. 1, in this example the gas flow path includes a gas conduit 22 that is provided to convey compressed air between the compressed gas layer 14 and the compressor/expander subsystem 100, which can convert the potential energy of compressed air to and from electricity. Similarly, a liquid supply conduit 40 is configured to convey water between the liquid layer 16 and the water 20 in shaft 18. Each conduit 22 and 40 may be formed from any suitable material, including metal, the surrounding rock, plastic and the like and may be of one-piece or multi-piece construction (with any desired valving and flow control equipment, etc.).

In this example, the gas conduit 22 has an upper end 60 that is connected to the compressor/expander subsystem 100, and a lower end 62 that is in communication with the compressed gas layer 14. The gas conduit 22 is, in this example, positioned inside and extends within the shaft 18, and passes through the bulkhead 24 to reach the compressed gas layer 14. Positioning the gas conduit 22 within the shaft 18 may eliminate the need to bore a second shaft and/or access path from the surface to the accumulator 12. The positioning in the current embodiment may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 and in the embodiment of FIG. 3, the gas conduit 22 may be external the shaft 18. Positioning the gas conduit 22 outside the shaft 18 may help facilitate the re-use of shafts used for construction, may help facilitate the remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid supply conduit 40 is, in this example, configured with a lower end 64 that is submerged in the water layer 16 while the system 10 is in use and a remote upper end 66 that is in communication with the interior 54 of the shaft 18. In this configuration, the liquid supply conduit 40 can facilitate the exchange of liquid between the liquid layer 16 and the water 20 in the shaft 18. As illustrated in FIG. 1, the liquid supply conduit 40 can pass through the bulkhead 24 (as described herein), or alternatively, as shown using dashed lines, may be configured to provide communication between the liquid layer 16 and the water 20, but not pass through the bulkhead 24.

In this arrangement, as more gas is transferred into the gas layer 14 during an accumulation cycle, and its pressure increases, in this alternative only slightly, water in the water layer 16 can be displaced and forced upwards through the liquid supply conduit 40 into shaft 18 against the hydrostatic pressure of the water 20 in the shaft 18, or more generally within the liquid flow path between the accumulator 12 and the reservoir 150. More particularly, water can preferably freely flow from the bottom of accumulator 12 and into shaft 18, and ultimately may be exchanged with the reservoir 150 of water, via the liquid flow path that also includes a replenishment conduit 58. Alternatively, any suitable type of flow limiting or regulating device (such as a pump, valve, orifice plate and the like) can be provided in the water conduit 40.

Conversely, when gas is removed from the gas layer 14, water can be flow from the shaft 18, through the water conduit 40 and into the accumulator to refill the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is forced into and released from the accumulator 12. That is, the changing water level can change the available gas volume within the accumulator 12 to account for the addition or removal of compressed gas, which can help keep the gas pressure at substantially the desired accumulator pressure (subject to minor variances as the gas flows) as the volume of gas within the accumulator 12 changes while in the charging and discharging modes.

Preferably, the lower end 64 of the liquid supply conduit 40 is positioned so that it is and generally remains submerged in the liquid layer 16 while the system 10 is in operational modes and is not in direct communication with the gas layer 14. In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower end 64 of the liquid supply conduit 40 is placed close to the lower wall 15. If the lower wall 15 is not flat or not generally horizontal, the lower end 64 of the liquid supply conduit 40 is preferably located in a low point of the accumulator 12 to help reduce the chances of the lower end 64 being exposed to the gas layer 14.

Similarly, to help facilitate extraction of gas from the gas layer, the lower end 62 of the gas conduit 22 is preferably located close to the upper wall 13, or if the upper wall 13 is not flat or generally horizontal at a high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

In the embodiment of FIG. 1, the partition includes a fabricated bulkhead 24 that is positioned to cover, and optionally seal the primary opening 27 in the accumulator perimeter. Alternatively, in other embodiments, the partition may be at least partially formed from natural materials, such as rock and the like (see FIG. 3). For example, a suitable partition may be formed by leaving and/or shaping portions of naturally occurring rock to help form at least a portion of the pressure boundary between the interior of the accumulator and the shaft. Such formations may be treated, coated or otherwise modified to help ensure they are sufficiently gas impermeable to be able to withstand the desired operating pressure differentials between the accumulator interior and the shaft. This may be done, in some embodiments, by selectively excavating the shaft 18 and accumulator 12 such that a portion of the surrounding rock is generally undisturbed during the excavation and construction of the shaft 18 and accumulator 12. Alternatively, rock or other such material may be re-introduced into a suitable location within the accumulator 12 and/or shaft 18 after having been previously excavated. This may help reduce the need to manufacture a separate bulkhead and install it within the system 10. In arrangements of this nature, the primary opening 27 may be formed as an opening in a sidewall 21 of the accumulator 12, or alternatively one side of the accumulator 12 may be substantially open such that the primary opening 27 extends substantially the entire accumulator height 17, and forms substantially one entire side of the accumulator 12.

When the accumulator 12 is in use, at least one of the pressurized gas layer 14 and the liquid layer 16, or both, may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 is dependent on the pressure of the gas 14 and the cross-sectional area (taken in plane 19) of the inner surface 29. For a given inner surface 29 area, the magnitude of the internal accumulator force 41 may vary generally proportionally with the pressure of the gas 14.

In the present embodiment, the system 10 includes a shaft 18 having a lower end 43 that is in communication with the opening 27 in the upper wall 13 of the accumulator 12, and an upper end 48 that is spaced apart from the lower end 43 by a shaft depth 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 m$^3$ of water. In other embodiments the shaft need not be cylindrical and may have other cross-sectional geometries with the same hydraulic diameter.

Preferably, as will be described, the pressure at which the quantity of water 20 bears against bulkhead 24 and can be maintained so that magnitude of the counter force 46 is equal, or nearly equal, to the magnitude of the internal accumulator force 41 exerted by the compressed gas in compressed gas layer 14 stored in accumulator 12, at least for portions of operation. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the upward pressure on the bulkhead 24 will be 1 Bar higher than the downward pressure on the bulkhead 24 from the water 20 in shaft 18.

Each of shaft 18 and accumulator 12 may be formed in the ground 200 using any suitable techniques, including techniques that are similar to those used for producing mineshafts and other underground structures.

Figure 2:
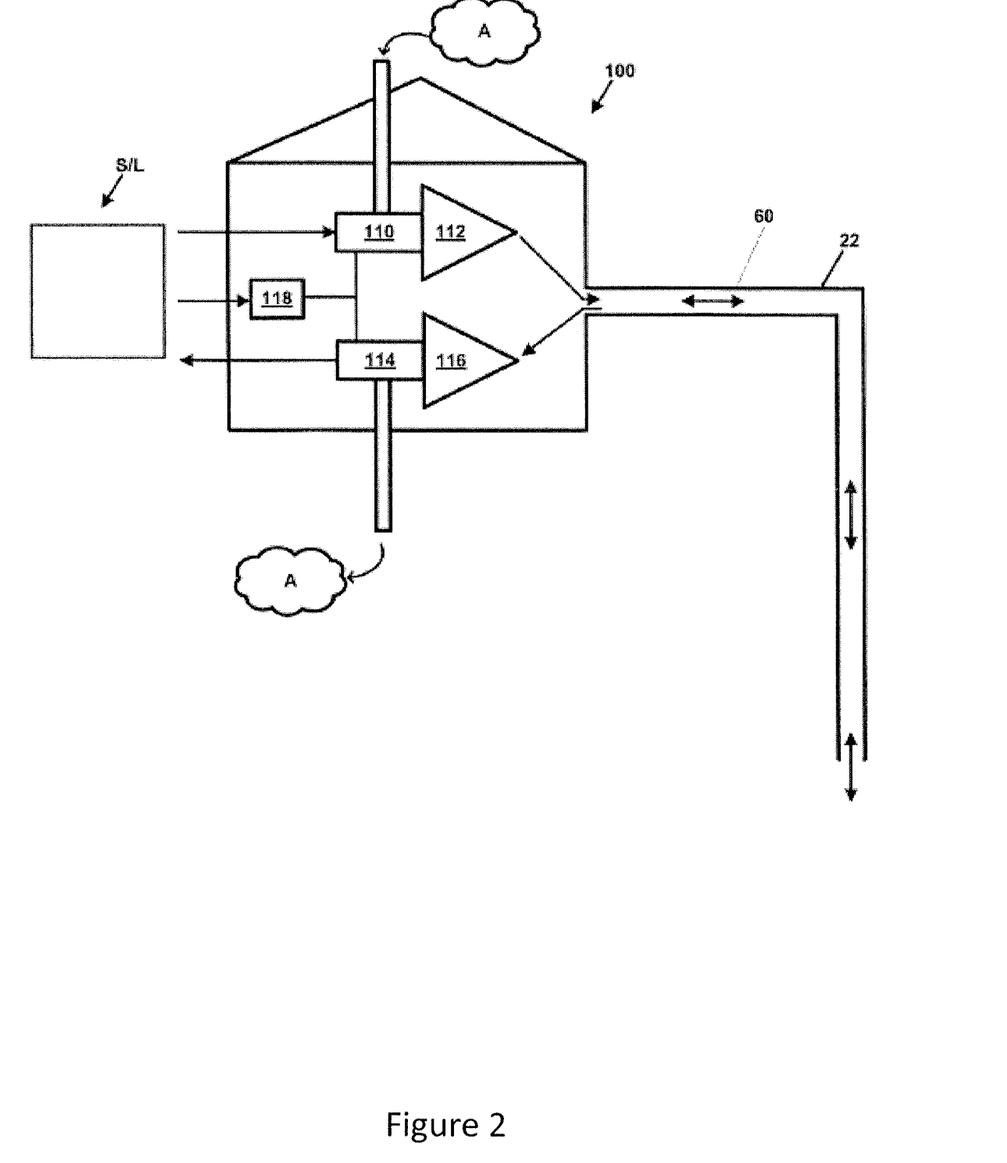
FIG. 2 is a schematic representation of a portion of the system of FIG. 1

FIG. 2 is a schematic view of components of one example of a compressor/expander subsystem 100 for the compressed gas energy storage system 10 described herein. In this example, the compressor/expander subsystem 100 includes a compressor 112 of single or multiple stages, driven by a motor 110 that is powered, in one alternative, using electricity from a power grid or by a renewable power source or the like, and optionally controlled using a suitable controller 118. Compressor 112 is driven by motor 110 during an accumulation stage of operation, and draws in atmospheric air A, compresses the air, and forces it down into gas conduit 22 for storage in accumulator 12 (via thermal storage subsystem 120 (see FIG. 1 for example) in embodiments including same). Compressor/expander subsystem 100 also includes an expander 116 driven by compressed air exiting from gas conduit 22 during an expansion stage of operation and, in turn, driving generator 114 to generate electricity. After driving the expander 116, the expanded air is conveyed for exit to the atmosphere A. While shown as separate apparatuses, the compressor 112 and expander 116 may be part of a common apparatus, as can a hybrid motor/generator apparatus. Optionally, the motor and generator may be provided in a single machine.

Air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116. For example, air (or other gas being used) exiting a given stage of a compressor 112 may be cooled prior to entering a subsequent compressor stage and/or the accumulator 12, and/or the air may be warmed prior to entering a given stage of an expander 116 and may be warmed between expander stages in systems that include two or more expander stages arranged in series.

The controller 118 can operate the compressor/expander subsystem 100 so as to switch between accumulation and expansion stages as required, including operating valves for preventing or enabling release of compressed air from gas conduit 22 on demand.

Optionally, any of the systems described herein may include a thermal storage subsystem that is configured to transfer heat/thermal energy out of and preferably also into the gas flowing through the gas flow path between the accumulator and the compressor/expander subsystem 100. Preferably, the thermal storage subsystem may be configured to extract thermal energy from the gas exiting at least one of the one or more compression stages in a given compressor/expander subsystem 100, and preferably being configured to extract heat from the gas exiting each compression stage 112. The extracted thermal energy can then be stored for a period of time, and then reintroduced into the gas as it is removed from the accumulator 12 and passed through one or more expanders 116.

Optionally, the compressed gas energy storage system 10 may include one or more auxiliary gas release subsystems that are separate from the gas conduit 22 to help facilitate the release of gas from the compressed gas layer 14. For example, if the pressure within the accumulator 12 approaches and/or surpasses a desired maximum storage pressure, venting at least some of the gas from the compressed gas layer 14 may help reduce the pressure to a desired range. This can also be used to help prevent the compressed gas layer 14 from reaching a level where it comes into fluid communication with the lower end 64 of the conduit 40. Such an auxiliary gas release subsystem preferably includes at least one auxiliary gas release conduit that is separate from the gas supply conduit 22 and may be configured to vent the gas into the ground, into a separate vent shaft, into the water filled shaft 18 or other desired location. For example, the gas release subsystem may enable further flexibility for regulating pressure within system 10 by being operable to release gas in the event that the differential between the pressure bearing against the outside of bulkhead 24 from within shaft 18 and the pressure bearing against the inside of bulkhead 24 from within accumulator 12 rises to such a level as to threaten the integrity of bulkhead 24 or its installation in place. For example, should the liquid 20 in shaft 18 be reduced to a level that lowers the pressure and thereby reduces the magnitude of the counter force 46 acting on the bulkhead 24 below a desired level, the gas release subsystem can enable release of the pressure within accumulator 12.

In this embodiment, the gas release subsystem includes an auxiliary gas release conduit 42 that is spaced from the gas supply conduit 22 and has an optional valve that is in communication with the compressed gas layer 14 and is, in this example, associated with bulkhead 24. The valve may preferably be a one-way or check valve such that it can allow gas to travel from the compressed gas layer 14 into the shaft 18, but impedes or prevents the flow of water 20 from the shaft 18 into the accumulator 12. The valve may be actuated using any suitable mechanism, including being configured as a pressure sensitive valve that can be biased towards a closed configuration and will open, preferably automatically, when the pressure in the compressed gas layer 14 exceeds a pre-set threshold limit, and/or may be configured to be opened and closed remotely (such as through remote hydraulic or electrical actuation) to permit gas from gas layer 14 to escape through bulkhead 24 on demand.

FIG. 3 is a schematic representation of another example of a compressed gas energy storage system 10B. The compressed gas energy storage system 10B is analogous to the compressed gas energy storage system 10A, and like features are identified using like reference characters. In this example the compressed gas storage system 10B is configured with a partition that includes a projection 200A, identified using cross-hatching in FIG. 3, that is formed from generally the same material as the surrounding ground 200.

In this example, the system 10B need not include a separately fabricated bulkhead 24 as shown in other embodiments. The system 10B in this embodiment is configured so that the gas supply conduit 22 is spaced apart from the projection 200A and does not extend through the partition. Instead, a separate shaft or bore can be provided to accommodate the conduit 22. To help provide liquid communication between the interior of the shaft 18 and the liquid layer 16, a liquid supply conduit 40 can be provided to extend through the projection 200A or, as illustrated, at least some of the liquid supply conduit 40 can be provided by a flow channel that passes beneath the projection 200A and fluidly connects the shaft 18 to the liquid layer 16, and in ends 64 and 66 of the liquid supply conduit 40 can be the open ends of the passage.

Alternatively, in some embodiments the gas supply conduit 22 may be arranged to pass through the partition/projection 200A as illustrated in FIG. 3. In this arrangement, the conduit 22 can be configured so that its end 62 is positioned toward the upper side of the accumulator 12 to help prevent the liquid layer 16 reaching the end 62. Alternatively, the gas supply conduit 22 need not pass through the partition, as schematically illustrated using dashed lines for alternative conduit 22.

Optionally, the system 10B may be arranged so that the gas supply conduit 22 passes at least partially through the liquid supply conduit 40. This may help reduce the number of openings that need to be provided in the partition/projection 200A. In the embodiment of FIG. 3, another optional arrangement of gas supply conduit 22 is shown using dashed lines and passes through the flow channel, from the shaft 18 into the interior of the accumulator 12. In this arrangement, the gas supply conduit 22 is nested in, and passes through the liquid supply conduit 40, and also passes beneath the projection 200A. Optionally, a configuration in which at least some of the gas supply conduit 22 is received within a portion of the liquid supply conduit 40 may also be utilized in other embodiments of the system 10 (including those described and illustrated herein), including those in which both the liquid supply conduit 40 and gas supply conduit 40 pass through the partition.

In some embodiments of a hydrostatically compensated compressed gas energy storage system, it may be desirable to have a shaft depth 50 that is smaller or shorter than that proposed by the example embodiments in FIG. 1 or 3, while still operating the system at analogous operating pressures. For example, reducing the shaft depth 50 may help reduce the construction time and construction costs associated with manufacturing the systems 10. It may also help facilitate the placement of other system components, such as the accumulator and the like, in desirable and/or advantageous locations. By way of nonlimiting example, it may be desirable to locate the accumulator at a relatively shallower depth than shown in FIG. 1 for example, so that it is at a depth (shown using shaft depth 50) of approximately 400 m instead of about 600 m, below the upper end of shaft 18, while still operating at about the same operating system pressures as an accumulator that is at a depth of about 600 m. The choice of accumulator depth may be based on construction costs, construction duration, by ground/soil conditions or other suitable criteria. In embodiments in which the shaft is shorter and is configured to have an upper-end open to the atmosphere (as shown in FIG. 1), the hydrostatic pressure at the bottom of the shaft 18 will decrease (as it is generally proportional to the shaft depth) when the system is in operation. This reduction in the hydrostatic pressure at the bottom of shaft 18 may be non-advantageous as it will also reduce the magnitude of the inwardly acting force counter force 46, while also reducing the accumulator pressure and in turn the outwardly acting force 41. Alternatively, the system can be configured so that the pressure at the bottom of shaft 18, and in turn counter force 46, exceeds the standard hydrostatic force that would be exerted by the volume of water within the shaft (for its height). For example, the pressure within the shaft may be increased by capping the top of the shaft with a suitable bulkhead or other pressure bearing seal, constructing or locating the liquid source/sink 150 at some height above the upper end of shaft 18 (200 m in this example), and fluidly connecting the shaft 18 to the liquid source/sink such that the pressure at the bottom of the modified and shortened 400 m shaft is about the same as the unmodified hydrostatic pressure would be at the bottom of a 600 m shaft as shown in FIG. 1 (e.g. ~60 bar if the liquid in the shaft is water).

The construction or location of the compensation liquid reservoir 150 at a higher elevation than the upper end 48 of the shaft 18 may be facilitated by any means, for example: by constructing shaft 18 at some location below a naturally elevated water body; by constructing a water reservoir or containment structure on the top or side of a hill, mountain, or other naturally occurring elevation difference some height above shaft 18; by constructing shaft 18 in a valley, pit, or other naturally occurring elevation difference below the water source/sink; by constructing shaft 18 at the bottom of an existing open pit mine, or other existing man made elevation difference below the compensation reservoir 150; by having the compensation reservoir 150 be a water tower or similar tank that is supported on a support apparatus (which may be a portion of the ground, a frame or structure, a building or the like); or by any other suitable means.

Preferably, embodiments of such systems could include a suitable accumulator and a suitable compressor/expander subsystem, including those described herein. The systems should also include a compensation shaft (e.g. shaft 18) extending between an upper end that is proximate the surface of the ground and a lower end that is proximate and in fluid connection with the accumulator (e.g. as described herein) and defining a shaft depth (see depth 50). An upper end wall can be configured to cover the upper end of the shaft and to isolate an interior of the compensation shaft from the ambient atmosphere. The compensation liquid reservoir in such systems can be spaced apart from the accumulator and offset above the upper end wall by a reservoir elevation that is preferably at least about 15%, and optionally may at least 20%, at least 25%, at least 30%, at least 40% and optionally at least 50% of the shaft depth. Optionally the reservoir elevation may be between about 20% and about 50% of the shaft depth.

A compensation liquid flow path can then be provided that extends between the compensation liquid reservoir and the accumulator and preferably includes the compensation shaft and one or more additional a liquid supply conduits, including a conduit that extends between the compensation liquid reservoir and the compensation shaft. In this configuration a total hydrostatic pressure at the lower end of the shaft is greater than a hydrostatic pressure at a depth that is equal to the shaft depth.

Figure 4:
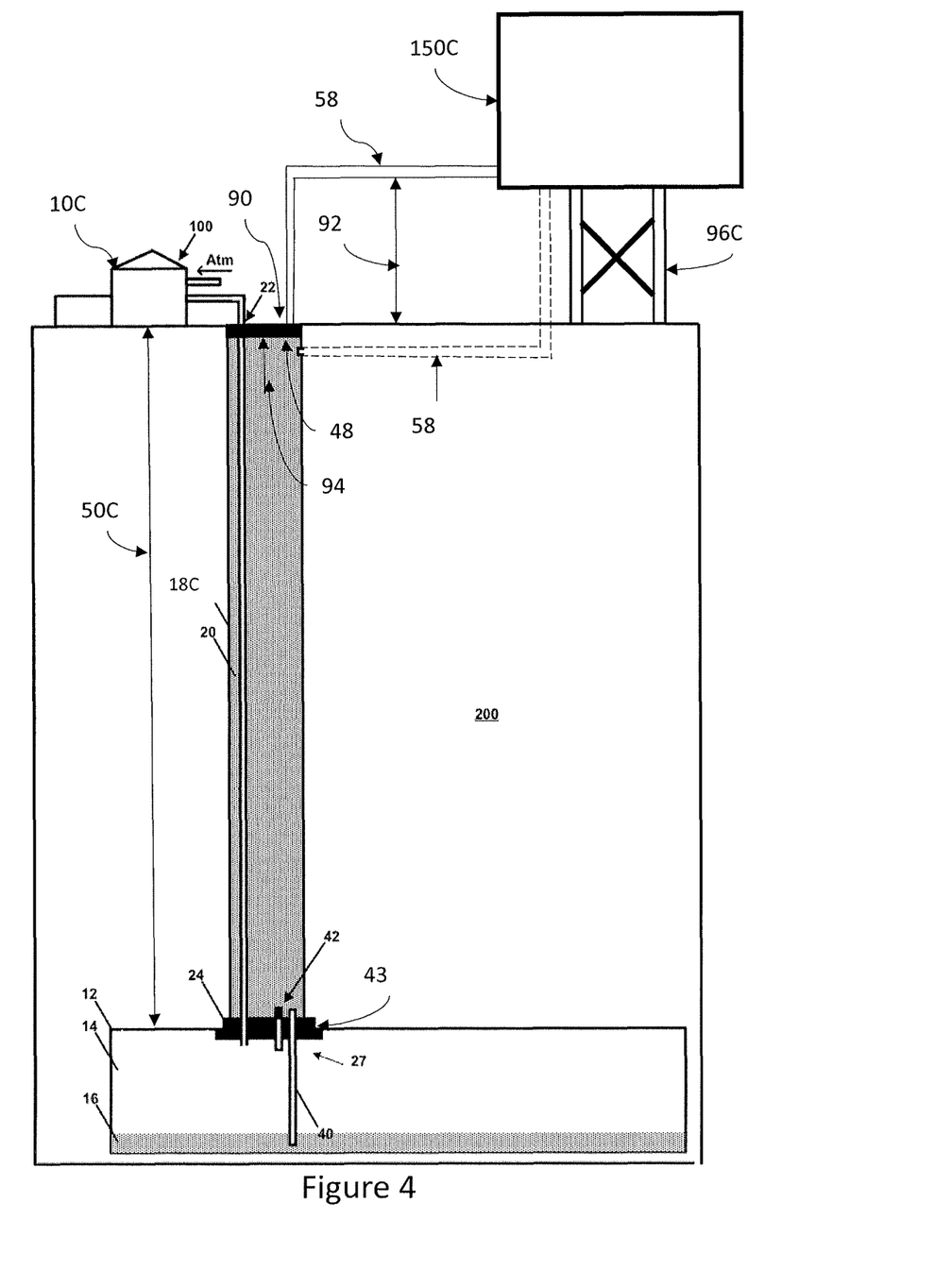
FIG. 4 is a schematic representation of another example of a compressed gas energy storage system with a reduced shaft depth and an elevated reservoir.

Referring to FIG. 4, one example of a hydrostatically compensated compressed gas energy storage system 10C is shown in which the accumulator 12 is located only about 400 m below the surface, and therefore the shaft depth 50C is also only about 400 m, which is less than the shaft depth 50 of the system shown in FIG. 1. If using a reservoir as shown in FIG. 1, the hydrostatic pressure at the lower end 43 of the shaft may be limited to approximately 38-42 bar. If a higher pressure is desired then an upper end wall in the form of an upper bulkhead or cover 90 can be positioned to cover the upper end 48 of the shaft 18 and the compensation reservoir 150C can be positioned as shown, such that it is raised above the cover 90 by a reservoir elevation distance 92 that is preferably at least 15% of the shaft height 50C. That is, if the shaft height 50C is about 400 m and an accumulator pressure of about 60 bar is desired, then the reservoir elevation may be about 200 m above the upper end of shaft 18C. This reservoir 150C may be fluidly connected to shaft 18 by any suitable mechanism, including by the water supply conduit 58 which may be a pipe, penstock, conduit, or any other type of fluid connection. System 10C is otherwise analogous to the system 10A, and like features are identified using like reference characters.

In system 10C as shown in FIG. 4, the height of the water in the shaft 18C may be significantly less than the height shown in the embodiment of FIG. 1, where the shaft depth 50 is greater. As a result, without connecting to the elevated reservoir 150C the hydrostatic pressure at the bottom of the shaft 18C would be less than the hydrostatic pressure at the bottom of the shaft 18 in FIG. 1 if left open to the atmosphere, and the resulting operating pressure would be lower than that of the embodiment shown in FIG. 1. In this hypothetical embodiment, if the system 10C is run at the same system/gas pressures as described in relation to the system of FIG. 1, the accumulator could potentially overcharge, and compressed gas could escape through standpipe 40 and into shaft 18C, resulting in the loss of stored energy.

Thus, to help facilitate operating the system 10C as shown in FIG. 4 at the same system/gas pressures as were used in the embodiment shown in FIG. 1, the system 10C creates a desired level of hydrostatic pressure at the lower end 43 in the shaft 18C by taking advantage of the combination of the shaft depth 50C and the reservoir elevation 92. The specific magnitude of the hydrostatic pressure and associated counter force on the partition may be modified or set during system construction by adjusting the elevation which the water reservoir is constructed at.

In this embodiment, the upper end 48 of the shaft 18C is capped by the upper bulkhead 90 to help isolate the upper-end of the shaft 18C from the atmosphere. This may help facilitate pressurization of the shaft 18C. By way of non-limiting example, in the embodiment as shown in FIG. 4, the upper bulkhead 90 may be secured to, and preferably sealed with the at least one sidewall 52 of the shaft 18C such that when the shaft is filled with water, the shaft 18C is substantially airtight and pressure bearing. Preferably, when the system 10C is in use the shaft 18C is filled entirely with liquid and has little or no air-filled headspace within the shaft 18C, which may complicate the pressurization process.

Further, as shown in FIG. 4, the system 10C can include a fluid connection to a reservoir which is some elevation above the top of shaft 18C and associated equipment (valves, controllers, motors, etc.) and may be configured to transport water between the elevated reservoir 150C, preferably at a non-pressurized state (i.e. at about atmospheric pressure) and the top of shaft 18C at a specified higher pressure set by the elevation of the reservoir (in this example ~20 bar if the liquid is water and the elevation 92 is about 200 m). The supplementary pressurized water in shaft 18C may then be directed into or out of the interior of the shaft 18C as required when the system 10C is in its different operational modes (charging mode and discharging mode, for example). The resulting supplementary pressurized water may exert and upward force 94 on the upper bulkhead 90. The pressure acting on the upper bulkhead 90 may be between about 10 bar and about 40 bar, or more, depending on the elevation of reservoir 150 above the upper end 48 of shaft 18C.

In this embodiment, the upper bulkhead 90 may be made of a material that is strong enough to withstand the upward force 94 of the over pressurized water 20C. Some examples of materials used to construct the bulkhead 90 may include, but are not limited to metal, concrete, or combinations thereof.

In the illustrated example, the water supply conduit 58 may include any suitable combination of valves, regulators, orifice plates and other flow controlling/restricting mechanisms to fluidly isolate the water in the source/sink from the water in shaft 18C if required during operation or for system maintenance. The conduit 58 may be fluidly connected to the shaft 18C at any suitable location, but preferably is connected at or at least close to the upper end 48. In this embodiment the water supply conduit 58 is connected to the bulkhead 90, which may simply construction of the system 10C and reduce or eliminate the need to excavate additional access points for the shaft 18C. Alternatively, as shown using dashed lines in FIG. 4, the water supply conduit 58 may be connected to the sidewall of the shaft 18C.

When the compressed gas energy storage system as shown in embodiment 10C is in its charging mode, compressed gas may be directed into the accumulator 12 via the gas conduit 22. As the volume of gas 14 within the accumulator 12 increases, liquid from the layer of liquid 16 in the accumulator 12 will be forced out of the accumulator 12, via conduit 40, and into the shaft 18C. As shaft 18C is already substantially full of water, and as water is generally incompressible, a similar volume of water will be forced to leave the shaft 18C, will travel up water supply conduit 58, and will flow back into the reservoir 150C.

When the compressed gas energy storage system as shown in embodiment 10C is in a discharging mode, compressed gas is being transferred from the accumulator 12 and into the compressor/expander subsystem 100 for expansion, such that the volume of gas 14 in the accumulator 12 decreases. As the volume of gas decreases, water from within the shaft 18C will flow into the accumulator 12, which may tend to reduce the volume of water within the shaft 18C and its pressure. If this occurs, the overall water pressure within the shaft 18C would decrease resulting in a reduced compressed gas pressure in the accumulator and a loss of energy. To prevent a reduction of water pressure in the shaft 18C during the discharging mode, water supply conduit 58 may be configured to transport additional make-up water from the elevated reservoir 150C into the shaft 18C. This can help ensure the shaft 18C is full and can help ensure that the hydrostatic pressure and accumulator pressure substantially the same during operation.

When the compressed gas energy storage system as shown in embodiment 10C is in a storage mode, compressed gas is neither flowing into or out of the accumulator 12, and no water is transported between the accumulator, shaft 18C, and the liquid reservoir 150C.

In this example, the compensation liquid reservoir 150C is configured as a tank or contained vessel, and is supported at the reservoir elevation using a reservoir support apparatus that includes a support structure 96C

While in FIG. 4 the compressor/expander subsystem 100 is shown to be constructed beside and at the same elevation as the top of shaft 18C, the compressor expander subsystem may alternatively be constructed beside and at the same elevation as the water source/sink with minimal effect on system performance. At certain sites it may be advantageous to construct the compressor/expander subsystem 100 at the same elevation as the reservoir, for example due to topography, land availability, or other reasons.

Figure 5:
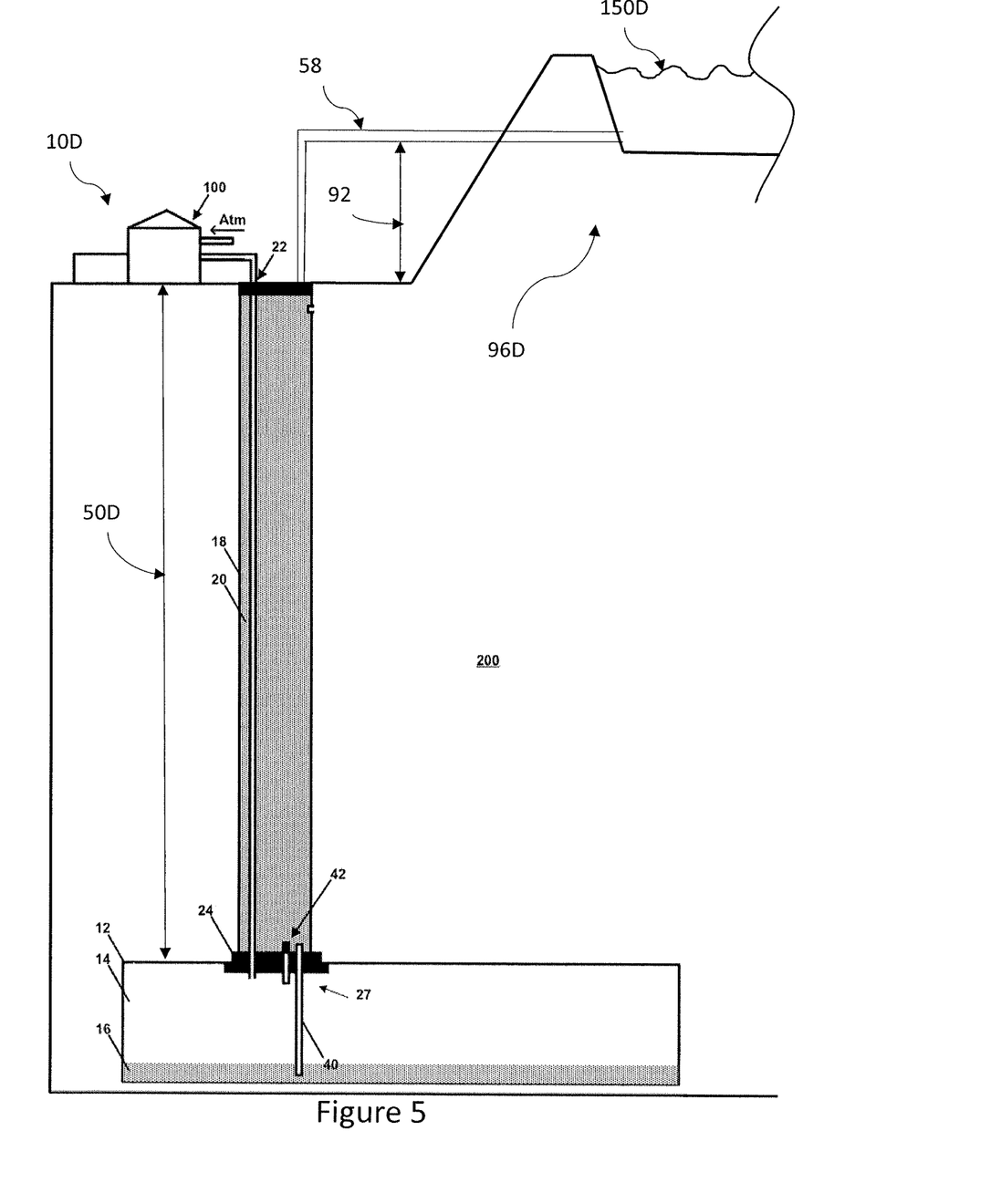
FIG. 5 is a schematic representation of another example of a compressed gas energy storage system with a reduced shaft depth and an elevated reservoir.

Referring to FIG. 5, another example of a system 10D having an elevated compensation liquid reservoir 150D. This system 10D is analogous to systems 10A-10C and like features are shown using analogous reference characters. In this example, the compensation reservoir 150D is an open containment (e.g. such as a man-made reservoir) region or body of water that is spaced above the bulkhead 90 by the reservoir elevation 92, which can optionally be about 100 m if the shaft depth 50D were about 500 m. This would help facilitate operating the system 10D at an accumulator pressure of about 60 bar, like the other systems herein, while having a shaft depth 50D that is different. In this example the compensation reservoir 150D is maintained at the higher elevation by a support apparats that is formed by a portion of the ground/earth 96D that surrounds the system 10D. This may be a substantially naturally occurring configuration or the dirt/ground may be formed to provide the desired elevation 92.

What has been described above has been intended to be illustrative of the invention and non-limiting and it will be understood by persons skilled in the art that other variants and modifications may be made without departing from the scope of the invention as defined in the claims appended hereto.

We claim:

1. A hydrostatically compensated compressed air energy storage system comprising:
   a) an accumulator disposed underground and comprising an interior for containing a layer of compressed air above a layer of compensation liquid;
   b) a compressor/expander subsystem in fluid communication with the accumulator interior via an air flow path and configured to selectably convey compressed air into the accumulator and to extract air from the accumulator;
   c) a compensation shaft extending between an upper end that is proximate a surface of a ground and a lower end that is proximate and in fluid connection with the accumulator and defining a shaft depth, an upper end wall being configured to cover the upper end of the shaft and to isolate an interior of the compensation shaft from the ambient atmosphere;
   d) a compensation liquid reservoir spaced apart from the accumulator and offset above the upper end wall by a reservoir elevation that is at least about 15% of the shaft depth;
   e) a compensation liquid flow path extending between the compensation liquid reservoir and the accumulator, the liquid flow path comprising the compensation shaft and a liquid supply conduit extending between the compensation liquid reservoir and the upper end of the compensation shaft whereby a total hydrostatic pressure at the lower end of the shaft is greater than a hydrostatic pressure at a depth that is equal to the shaft depth;
   wherein the system is operable in at least:
      a charging mode in which the gas compressor/expander subsystem is configured to covey compressed air at an accumulator pressure into the layer of compressed air within the accumulator which then displaces a corresponding volume of compensation liquid from the layer of compensation liquid within the accumulator out of the accumulator via the compensation liquid flow path thereby maintaining the layer of compressed air at substantially the accumulator pressure during the first charging mode; and
      a discharging mode in which the gas compressor/expander subsystem is configured to extract compressed air from within the accumulator which then enables a corresponding volume of compensation liquid to enter the accumulator via the compensation liquid flow path thereby maintaining the pressure within the accumulator at substantially the accumulator pressure during the discharging mode.

2. The system of claim 1, wherein the liquid supply conduit is connected to an opening in the upper end wall of the compensation shaft.

3. The system of claim 1, wherein the liquid supply conduit is connected to an opening in a sidewall of the shaft, proximate the upper end of the compensation shaft.

4. The system of claim 1, wherein the compensation liquid reservoir comprises at least one of an enclosed tank, an open containment region and a body of water.

5. The system of claim 4, wherein the compensation liquid reservoir is supported at the reservoir elevation by a reservoir support apparatus.

6. The system of claim 5, wherein the reservoir support apparatus comprises a portion of the ground.

7. The system of claim 1, wherein the reservoir elevation is at least 20% of the shaft depth.

8. The system of claim 7, wherein the reservoir elevation is between about 20% and about 50% of the shaft depth.

9. The system of claim 1, wherein the reservoir elevation is between about 50 m and about 250 m.

10. The system of claim 9, wherein the reservoir elevation is between about 100 m and about 200 m.

11. The system of claim 1, wherein the shaft depth is at least 300 m.

12. The system of claim 11, wherein the shaft depth is between about 400 m and about 500 m.

13. The system of claim 1, wherein a sum of the shaft depth and the reservoir elevation is at least 500 m.

14. The system of claim 1, wherein the shaft depth is measured in a downward direction from the upper end wall of the shaft and the reservoir elevation is measure in an opposing, upward direction from the upper end wall of the shaft.

15. The system of claim 1, wherein the accumulator pressure is between about 40 and about 70 bar.

16. The system of claim 15, wherein the accumulator pressure is between about 50 and about 60 bar.

17. The system of claim 1, wherein the total hydrostatic pressure is at least 80% of the accumulator pressure.

18. The system of claim 17, wherein the total hydrostatic pressure is at least 95% of the accumulator pressure.

19. The system of claim 1, wherein the total hydrostatic pressure is the hydrostatic pressure at a depth that is equal to the shaft depth plus the reservoir elevation.

20. The system of claim 1, wherein the compensation liquid comprises at least one of water, brine, oil and a combination thereof.

* * * * *